(12) United States Patent
Lomonaco et al.

(10) Patent No.: US 6,366,832 B2
(45) Date of Patent: Apr. 2, 2002

(54) COMPUTER INTEGRATED PERSONAL ENVIRONMENT SYSTEM

(75) Inventors: Carol Lomonaco, Wauwatosa; John R. Bobek, Brookfield, both of WI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/198,907

(22) Filed: Nov. 24, 1998

(51) Int. Cl.$^7$ ............................................. G01M 1/38
(52) U.S. Cl. .................. 700/276; 700/300; 236/49.3; 454/49; 454/370
(58) Field of Search ............................... 700/276, 277, 700/299, 300; 236/49.3, 49; 454/49, 370

(56) References Cited

U.S. PATENT DOCUMENTS

| | | | | |
|---|---|---|---|---|
| 4,407,447 A | * | 10/1983 | Sayegh ........................ | 236/49 |
| 4,843,084 A | * | 6/1989 | Parker et al. ................ | 700/277 |
| 4,872,397 A | * | 10/1989 | Demeter et al. ............. | 454/229 |
| 4,931,948 A | * | 6/1990 | Parker et al. ................ | 700/277 |
| 4,969,508 A | * | 11/1990 | Tate et al. ................... | 165/209 |
| 5,117,900 A | * | 6/1992 | Cox .............................. | 165/53 |
| 5,275,333 A | * | 1/1994 | Tamblyn ...................... | 236/51 |
| 5,344,068 A | * | 9/1994 | Haessig ........................ | 236/47 |
| 5,385,297 A | * | 1/1995 | Rein et al. ................... | 236/49.3 |
| 5,446,677 A | * | 8/1995 | Jensen et al. ................ | 700/277 |
| 5,467,919 A | * | 11/1995 | Tamblyn ...................... | 236/49.3 |
| 5,682,949 A | * | 11/1997 | Ratcliffe et al. ............. | 165/209 |
| 5,725,148 A | * | 3/1998 | Hartman ....................... | 236/49.3 |
| 5,971,597 A | * | 10/1999 | Baldwin et al. ............. | 700/277 |
| 6,006,142 A | * | 12/1999 | Seem et al. .................. | 700/276 |
| 6,029,092 A | * | 2/2000 | Stein ............................ | 700/11 |
| 6,220,518 B1 | * | 4/2001 | Kline et al. .................. | 236/49.3 |
| 6,241,156 B1 | * | 6/2001 | Klin et al. ................... | 236/49.3 |

* cited by examiner

*Primary Examiner*—William Grant
*Assistant Examiner*—Ronald D Hartman, Jr.
(74) *Attorney, Agent, or Firm*—Foley & Lardner

(57) ABSTRACT

The environment of a work space is regulated by a controller connected to a computer network. A personal computer within the work space also is connected to the computer network and displays a control panel with symbols that a worker is able to alter to change environmental parameters operated by the controller. Such environmental parameters may include air flow, temperature and lighting intensity. The settings of the environmental parameters on the computer display are sent to the controller via the computer network. Air diffusers are attached to the computer display device and supplied with air regulated by the controller.

20 Claims, 3 Drawing Sheets

COMPUTER INTEGRATED PERSONAL ENVIRONMENT SYSTEM

BACKGROUND OF THE INVENTION

The present invention relates to heating, ventilation, and air conditioning systems of buildings; and more particularly to personal environment components of such building systems which provide conditioned air to a person's work space.

A personal work area unit for controlling the environment at a work space, such as an employee's desk or cubicle, is described in U.S. Pat. No. 4,872,397. The unit is located beneath a work surface and includes a pair of air inlets. One inlet is connected to a duct of the building's heating, ventilation, and air conditioning (HVAC) system to receive conditioned air. The other inlet of the personal work area unit receives ambient air from the room in which the module is located. Two dampers control the ratio of conditioned air to ambient air drawn into the module by a pair of fans and mixed within the module. The mixed air is directed through one or more outlet ducts which lead to a pair of vents located in housings on the work space surface.

A control panel also is located on the work surface of the cubicle or desk and has a number of controls for regulating the air flow. Specifically, a control is provided to regulate the speed of the fans and another control governs the dampers to vary the mixture of conditioned air and ambient air. Other controls may be provided to vary the intensity of lighting within the work space and operate a conventional background environment control unit generator to produce a sound which masks ambient noise Another control operates a radiant heater located beneath the work surface to provide a localized heating.

An infrared occupancy sensor is provided to detect the presence of a worker within the work space and activate the personal work area unit.

The personal work area unit allows an individual employee to control the environment of his or her work space. This type of system is specially desirable in a large open area where the work spaces are defined by cubicles as the system permits each worker to set the environment of the individual cubicle.

One of the drawbacks of a personal work area unit is the amount of the work surface that is occupied by the vent housings and control panel. This is especially a problem in open-plan office designs, such as where a large floor area is subdivided with cubicles.

SUMMARY OF THE INVENTION

A general object of the present invention is to provide an environment system which allows an individual employee to control the environment of his or her work space.

Another object is to provide such a environment system which occupies a minimal amount of the work space.

A further object of the present invention is to integrate components of the environment system with those of a personal computer.

These and other objectives are satisfied by employing an flow control device to regulate the air flow within the work space. A controller operates the flow control device in response to data received via a computer network which interconnects computers and printers within the building. In the preferred embodiment, the regulated air flow is emitted from diffusers attached to a display monitor of a personal computer within the work space.

The personal computer is connected to the computer network and executes a graphical user interface program. That graphical user interface program displays a control panel on a screen of the personal computer and enables a worker to alter an environmental parameter setting by changing symbols located on the control panel. The personal computer transmits data representing the environmental parameter setting from the personal computer to the controller via the computer network. The controller responds to the data from the personal computer by operating a flow control device.

The controller may govern environmental parameters such as air flow rate, temperature, lighting intensity and noise masking within the work space.

DETAILED DESCRIPTION OF THE INVENTION

Figure 1:
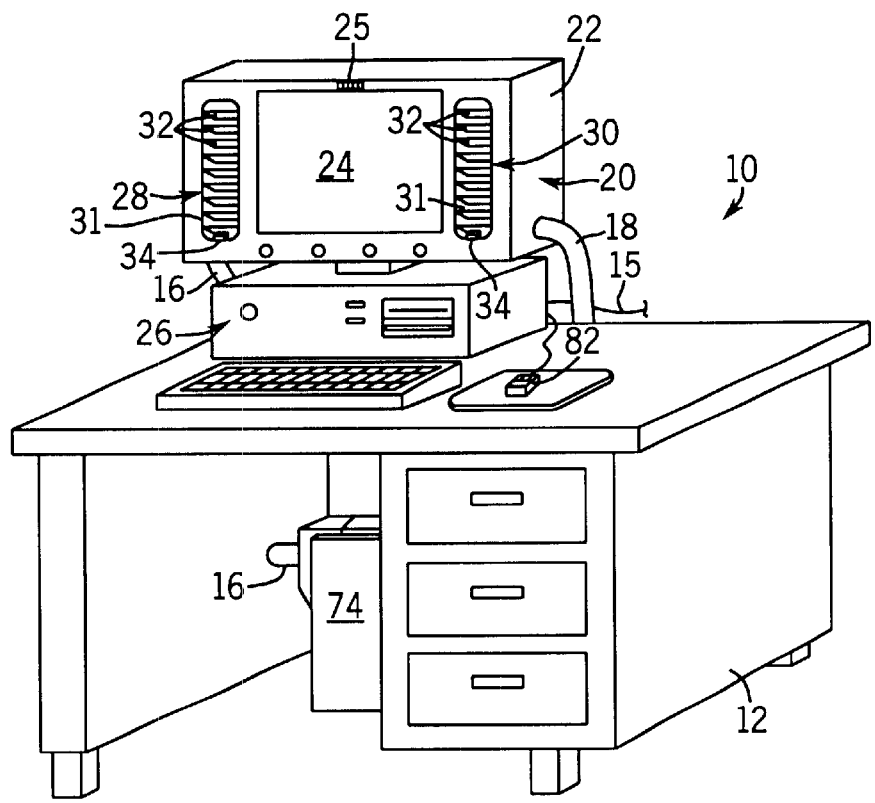
FIG. 1 is an isometric view of a personal work area control system located on a desk.

With initial reference to FIG. 1, a personal work area control system 10, according to the present invention, is adapted to be located adjacent a desk 12 or other work surface, such as that of a modular cubicle. The system 10 comprises an environment control unit 14 which receives room air from the space beneath the desk 12 and optionally may be connected to the HVAC duct system for the building. Connection of the environment control unit 14 to the building duct system furnishes conditioned air to the environment control unit. As will be described, the environment control unit distributes the air to flexible, telescoping ducts 16 and 18 which extend from the environment control unit 14 to the enclosure 20 of a computer monitor 22 which is located on top of the desk 12.

The computer monitor 22 has a conventional display screen 24 and is connected to the remaining components of a personal computer 26 on the desk 12. As used herein the term "personal computer" includes desktop computers, lap top computers (with and without a docking station) and hand-held computers which are connected to a computer network that interconnects numerous computers, network servers, printers and other types of computer equipment within the building. A pair of air diffusers 28 and 30 are built into the monitor enclosure 20 on opposite sides of the screen 24. The interior of the monitor enclosure 20 is subdivided into a center cavity for the monitor display screen 24 and outer chambers for each diffuser 28 and 30 which outer chambers are supplied with forced air from the flexible ducts 16 and 18.

Each diffuser 28 and 30 comprises a movable louver 31 having a plurality vanes 32 which can be pivoted about horizontal axes and each louver 31 can be pivoted about a vertical axis. The vanes are connected together and to a control lever 34 by which the worker can individually adjust the horizontal and vertical orientation of each diffuser 28 and 30. That two dimensional movement enables the worker to direct the air flow from the diffuser air left and right, and up and down with respect to the monitor screen as desired.

As will be described, the employee within the work space controls the function of the personal work area control system 10 by manipulating control elements on the screen 24 of the personal computer 26. The monitor 22 includes an infrared occupancy detector 25 which senses changes in infrared radiation in front of the monitor, thereby detecting body heat given off by a worker to sense the presence of that worker within the environment being controlled. This provides a signal to a control circuit within the environment control unit 14 which activates the control system 10.

Figure 2:
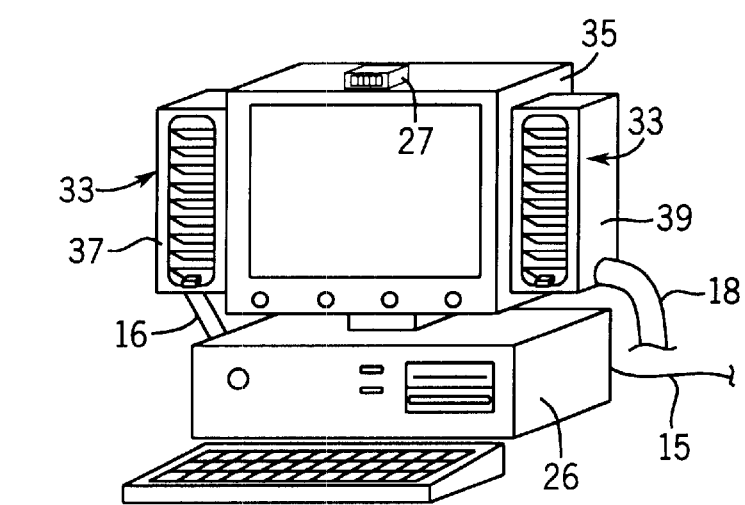
FIG. 2 is an alternative embodiment of a computer monitor incorporating components of the personal work area control system.

FIG. 2 depicts an alternative embodiment in which a pair of diffusers 33 have a separate housings 37 and 39 that are attached to opposite sides of a standard computer monitor 35. This attachment may be relatively permanent, such as by means of screws, bolts or other fasteners, or the diffuser housings 37 and 39 may be removable, in which case standard hook and loop type fasteners may be employed. As with the previous embodiment, the flexible ducts 16 and 18 extend between the diffusers 33 and the environment control unit 14 beneath the desk 12. In this embodiment, an infrared occupancy detector 27 is located within a separate enclosure that is positioned at the top surface of monitor 35 facing the user.

Figure 3:
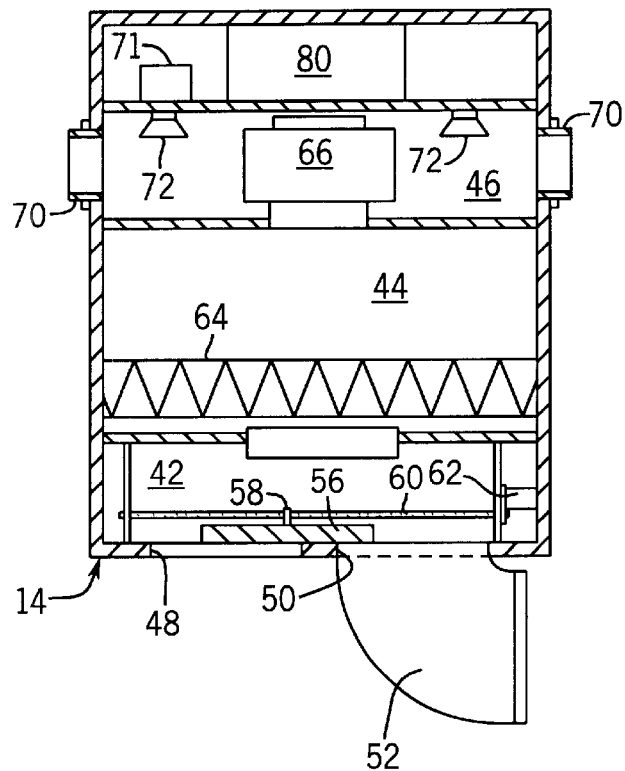
FIG. 3 is a cross section of the environment control unit for the personal work area control system.

With reference to FIG. 3, the environment control unit 14 includes a housing 40 having an inlet chamber 42, a central plenum 44 and an outlet plenum 46. Room air enters the inlet chamber 42 through an aperture 48 in the bottom of the housing 40. An HVAC supply duct for the building (not shown) can be connected to the environment control unit 14 by a branch duct 52 which extends through an aperture 50 in the housing 40.

A damper plate 56 is located within the inlet chamber 42 and is able to slide across the inlet apertures 48 and 50. The damper plate 56 has an upwardly extending arm 58 with a threaded hole through which a threaded shaft 60 extends. One end of the threaded shaft 60 is connected to a motor 62. When the motor 62 rotates the shaft 60, the damper plate 56 moves across the inlet apertures 48 and 50 thereby changing the effective size of those apertures. For example, when the damper plate 56 is in the extreme right position of its travel, in the orientation shown in FIG. 3, the HVAC inlet aperture 50 is completely closed and the room air inlet aperture 48 is fully open. Correspondingly, when the damper plate 56 is moved to the extreme left position, the room air inlet aperture 48 is fully closed and the HVAC inlet aperture 50 is fully opened. Limit switches (not shown) may be provided to indicate when the damper plate 56 is in each of its extreme positions of travel and supply control signals to deactivate the motor 66. As the damper plate 56 moves between the two extreme positions, the two inlet apertures 48 and 50 are opened and closed to proportionate degrees. Positioning the damper plate 56 at various locations across the inlet apertures controls the relative amounts of room air and HVAC supply air that enter and become mixed in inlet chamber 42.

A conventional air filter 64, of a type commonly found in air handling systems, is mounted across the central plenum 44. An electric fan 66 draws air through the filter 64 and expels that air into the outlet plenum 46. The fan 66 directs the forced air outward through a pair of discharge cones 70 which connect to the flexible ducts 16 and 18 shown in FIG. 1. Those ducts 16 and 18 couple the environment control unit 14 to the diffusers 28 and 30 of the computer monitor enclosure 20. Thus the environment control unit 14 mixes conditioned air from the HVAC system and room air in desired proportions. That air mixture is filtered and forced to diffusers 28 and 30 from which the air is fed into the work space immediately adjacent the computer 26. The personal work area control system 10 also may be used without being connected to the building HVAC system, in which case the inlet aperture 50 is closed permanently and only room air is circulated through the environment control unit 14.

Figure 4:
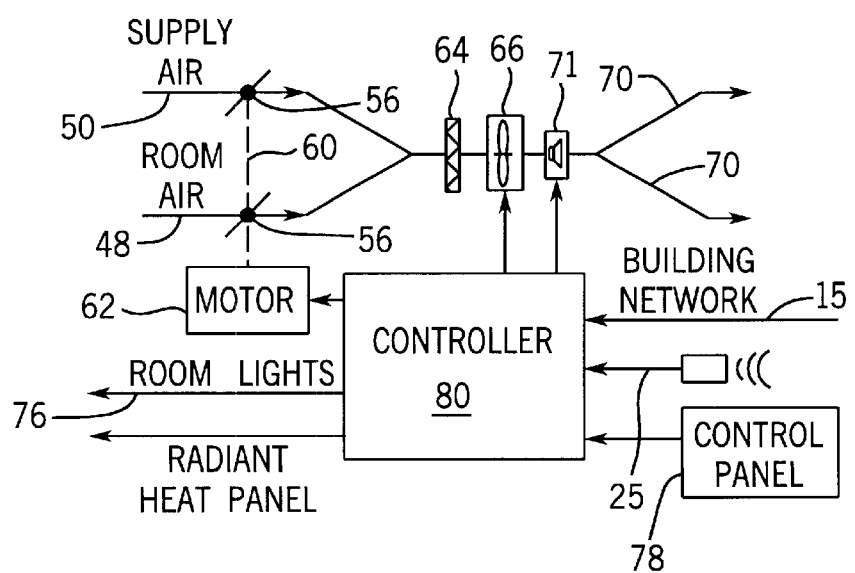
FIG. 4 is a schematic view of the environment control unit.

FIG. 4 schematically shows the air flow through the environment control unit 14. The damper motor 62 and the motor of fan 66 are operated by a controller 80 located within the enclosure of the environment control unit. In addition, the controller provides an output that operates a radiant heat panel 74 attached to the front surface of the environment control unit 14 in FIG. 1. However, the radiant heat panel 74 may be located on other surfaces of the work environment or mounted in a separate stand to provide localized heating. The lighting of the work space in the vicinity of the personal work area control system 10 also can be turned on and off and dimmed by the controller 80. These may be task lights located within a cubicle or room lights where the desk 12 is located within its own room. For this purpose, the controller produces an electrical signal on output 76 which is connected to an input for a standard lighting controller which can dim the associated lights in response to the signal. A background noise generator 71, operated by the controller 80, is connected to a pair of speakers 72 located within the outlet plenum 46 to provide sound that masks objectionable room noise. Such sound may be white noise, pink noise or music.

As with previous personal work area control systems, the controller 80 may receive operational input signals from a standard control panel 78 such as that described in U.S. Pat. No. 4,872,397. However, the individual control panel 78 takes up space on the work surface within the personal work area. As a consequence, it is preferred that the controller 80 receives input signals via a computer network 15 within the building. This type of computer network 15 is commonly utilized to interconnect numerous personal computers, network servers, printers and other types of computer equipment. The personal computer 26 on the desk 12 is connected to that computer network 15. The controller 80 is provided with a standard network communication circuit to interface the building computer network 15 with the internal circuits of controller 80. This type of communication circuit is similar to that used in the personal computer 26 to connect to the building network.

Figure 5:
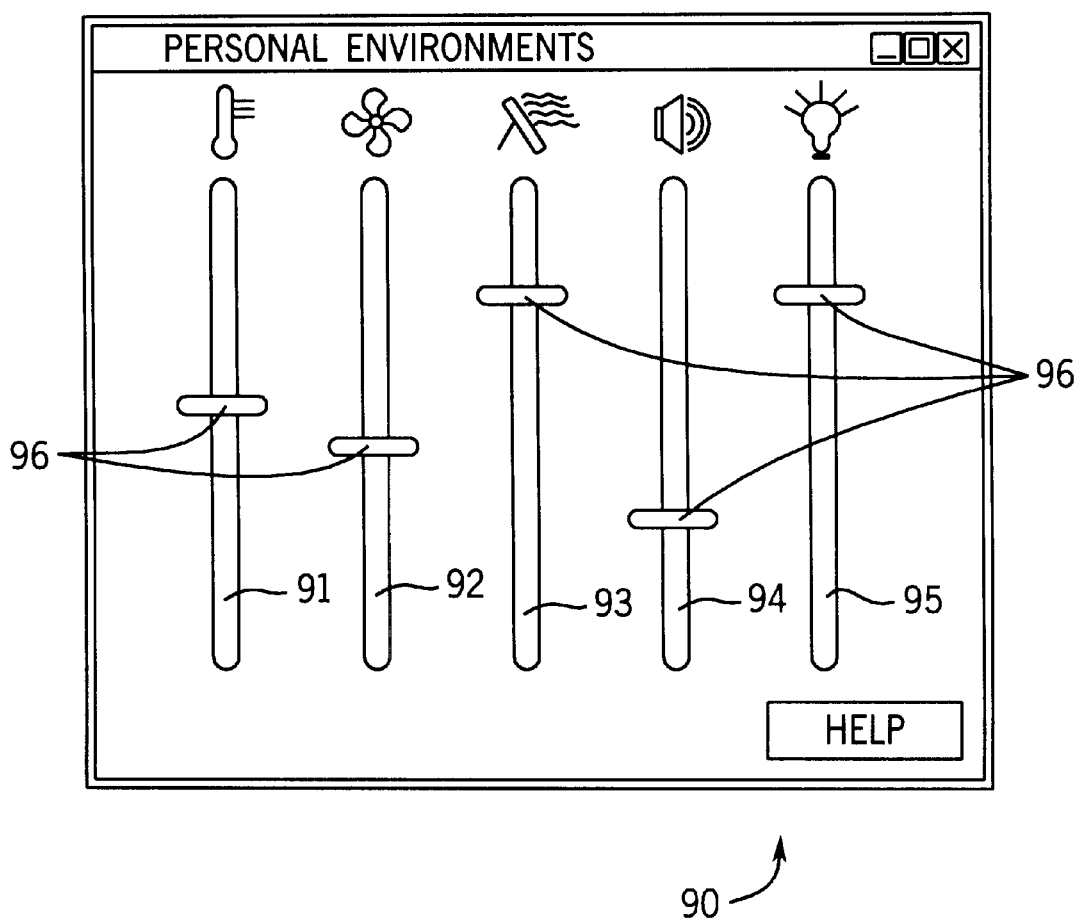
FIG. 5 depicts the screen of a personal computer which is interfaced to control operational parameters of the personal work area control system.

To accomplish the control of the personal work area control system 10, the personal computer 26 executes a computer program which displays a graphical user interface (GUI) 90 on the screen 24 of the computer monitor 22, as shown in FIG. 5. Graphical user interfaces are commonly used to enable the operator of a personal computer to input data and set configuration parameters in a wide variety of computer programs by manipulating symbols and numerical values displayed on the screen of a computer monitor. The graphical user interface 90 depicts five slider controls 91–95 similar to the physical controls which are found on the control panel 78. Each slider control 91–95 operates a different function of the personal work area control system as designated by an icon immediately above the slider symbol. For example, the first slider control 91 regulates the damper motor 62 to position the damper plate 56 and regulate the temperature of the air flowing out of the diffusers 28 and 30. The second slider control 92 governs the speed of the fan 66 and the third slider control 93 regulates the heat output of the radiant heat panel 74. The fourth slider control 94 varies the volume of the background noise generator 71, and the fifth slider control 95 is used to control the intensity of the work space lighting via output 76 of the controller 80.

The employee utilizing the work space is able to manipulate the various slider controls 91–95 utilizing the computer mouse 82 shown in FIG. 1. Specifically, the worker uses the mouse 82 to position a cursor on the computer screen 24 over the knob 96 of the selected slider control. For example, if the employee wishes to alter the temperature of the air emitted from the diffusers 28 and 30 the cursor would be placed over the knob 96 of the first slider control 91. By then pressing a button on the mouse 82 the user is able to move the knob 96 up and down to correspondingly vary the temperature of the air emitted from the diffusers. During the air conditioning season when relatively cool air is supplied by the building HVAC system, the first slider control 91 operates the damper motor 62 to increase the size of the aperture above the HVAC inlet aperture 50 and close the aperture of the room air inlet aperture 48 in order to decrease the temperature of the air emitted from the personal work area control system 10. Such manipulation of the knobs 96 of the graphically depicted slider controls 91–95 is similar to the manner in which slider controls of other types of graphical user interfaces, such as the volume controls of the CD ROM controller, are varied in present day computers.

As the user varies the position of the knobs of the slider controls 91–95 displayed on the personal computer screen 24, the GUI program executed by the computer 26 senses the changed position and transmits a digital value to the personal work area control system controller 80 representing the new position of the associated slider knob 96. The computer network 15 within the building is employed for that data transmission.

To that end, the personal work area control system 10 is connected to the building network 15 and has been assigned a unique device address on that network in the same manner as the personal computer 26, a printer and other devices are assigned network addresses. The graphical user interface program executed by personal computer 26 has been configured with the network address of the associated personal work area control system 10. Therefore when the graphical user interface program detects a change in the user settings, a data packet indicating the changed setting and the address of the controller 80 for the associated personal work area control system 10 is sent by the personal computer over the network 15. The addressed controller 80 receives the data packet from the computer network 15 and extracts the digital values representing the settings of each slider control 91–95.

The controller 80 responds to these digital values by producing corresponding output signals for each of the work space devices being controlled. In the case where the knob 96 of the first slider control 91 is moved, controller 80 changes the signal sent to the damper motor 62 to drive the threaded shaft 60 in a manner which positions the damper plate 56 as indicated by the received digital value for that function.

Although not required for the basic operation of the personal work area control system 10, it is preferred that the monitor include an infrared occupancy sensor to detect when a worker is present within the environment which is controlled by the system 10. The infrared occupancy detector 25 shown in FIG. 1 is similar to conventional infrared sensors that are used to detect the presence of a person within a defined area and to produce a signal indicating detection of that presence. The preferred implementation of the present invention provides a direct connection between the occupancy detector 25 and the controller 80 within the environment control unit 14. Alternatively, the output of the occupancy detector 25 could be coupled to an input to the personal computer 26 which input would be read by the graphical user interface program as another bit of data to transmit via the building computer network 15 to the controller 80. With either type of signal connection, the controller 80 responds to an indication that there is an occupant of the work space by activating the environment control unit 14 to supply conditioned air to the work space as indicated by the settings of the slide controls 91–95 of the graphical interface 90.

The controller 80 of the personal work area control system 10 can also receive other commands from other computers connected to the building computer network 15. For example, prior to the start of the normal work day, the building HVAC computer can send a command which causes the controller 80 to move the damper plate 56 into a position which fully opens the HVAC inlet aperture 50 and also turns on fan 66 to maximum speed. This supplies a relatively large quantity of conditioned air to the area serviced by the personal work area control system thereby conditioning that space for the work day prior to occupancy. Typically during the non-business hours, the temperature of the work space will be relatively warm in the summer and cool in the winter and this command from the building HVAC computer will result in the work space being brought to the normal temperature worker comfort level. When the start of business hours is reached, the building HVAC computer send another command over the computer network 15 which returns the personal work area control system 10 to local control. That is the previous setting of the graphical user interface 90 control device operation in conjunction with the infrared occupancy detector 25.

Data regarding the settings and operation of the personal work area control system 10 may also be transmitted by its controller 80 through the building network 15 to a central building HVAC computer, where that information is logged for analysis to determine the optimal performance of the entire HVAC system for the building.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. For example, a serial port of the personal computer 26 could be tied directly to a serial port of the controller 80 for the exchange of data instead of utilizing a standard computer communication network in the building. Accordingly, the scope of the invention should be determined from the following claims and not limited by the above disclosure.

What is claimed is:

1. A personal work area control system for controlling a local environment at a work space in a building, the system comprising:
 a variable flow control device which responds to a control signal by regulating air flowing through outlets at the work space;
 a controller at the work space and connected to a standard computer communication network to receive data packets including operational commands for the variable flow control device, the controller being assigned a unique device address on the communication network; and a personal computer at the work space and connected to the standard computer communication network, the personal computer being programmed to execute a user interface program that enables a worker to set a desired value for an environmental parameter setting, the user interface program configured to embed the desired value of the environmental parameter setting in a data packet along with the unique device address of the controller;

wherein the controller responds to the data packet containing the unique device address by producing the control signal which alters the flow control device.

2. The system of claim 1, wherein the controller extracts at least one digital value from the data packet, the at least one digital value representing a desired setting for at least one device selected from a fan, a light, a heater, a damper and a sound source.

3. The system of claim 2, wherein the controller produces corresponding output signals for each of the devices being controlled.

4. The system of claim 1, wherein the variable flow control device includes an air diffuser having a louver that is adjustable by a worker within the work space to direct flow of air from the diffuser.

5. The system of claim 4, wherein the air diffuser is integrated into a monitor of the personal computer.

6. The system of claim 4, wherein the air diffuser is attached to a monitor of the personal computer.

7. The system of claim 1, wherein the standard computer communication network interconnects numerous personal computers, network servers and printers within the building.

8. The system of claim 1, wherein the controller includes a standard network communication circuit to interface the standard computer communication network with internal circuits of the controller.

9. The system of claim 1, wherein the user interface is a graphical user interface.

10. The system of claim 9, wherein the graphical user interface displays a virtual control panel on a screen of the personal computer.

11. The system of claim 10, wherein the virtual control panel includes a plurality of slider controls that operate different functions of the personal work area control system selected from a fan, a light, a heater, a damper and a sound source.

12. A method of controlling a local environment at a work space in a building, the method comprising:

positioning a variable flow control device at the work space, the variable flow control device being configured to respond to a control signal by regulating air flowing through outlets at the work space;

positioning a controller at the work space, connecting the controller to a standard computer communication network to receive data packets including operational commands for the variable flow control device, and assigning a unique network device address to the controller;

positioning a personal computer at the work space and connecting the personal computer to the standard computer communication network;

executing a user interface program on the personal computer to enable a worker to set a desired value for an environmental parameter setting, the user interface program embedding the desired value of the environmental parameter setting in a data packet along with the unique device address of the controller;

transmitting the data packet onto the standard computer communication network; and the controller responding to receipt of the data from the personal computer by producing the control signal which alters the flow control device.

13. The method of claim 12, wherein operating the flow control device comprises one or more of controlling a position of a damper, activating a motorized fan, and controlling a speed of a motorized fan.

14. The method of claim 12, further comprising connecting a light to the controller, and wherein executing the user interface program enables a worker to alter an environmental parameter setting for the light.

15. The method of claim 12, further comprising connecting a sound source to the controller, and wherein executing the user interface program enables a worker to alter an environmental parameter setting for the sound source.

16. The method of claim 12, further comprising connecting a heater to the controller, and wherein executing the user interface program enables a worker to alter an environmental parameter setting corresponding to temperature, the controller converting the temperature setting to a heater command.

17. The method of claim 12, further comprising incorporating an air diffuser into a display monitor of the personal computer and coupling the air diffuser to receive air from the flow control device.

18. The method of claim 12, further comprising:

connecting a building HVAC controller to the computer network; and transmitting control data from the building HVAC controller to the controller;

wherein the controller responds to the control data by altering at least one characteristic of the work space selected from the group consisting of flow of air, lighting, temperature, and background sound level.

19. The method of claim 12, wherein executing the user interface program includes generating a virtual control panel on a screen of the personal computer.

20. A personal work area control system for controlling a local environment at a work space in a building, the system comprising:

a variable flow control device which responds to a control signal by regulating air flowing through outlets at the work space;

a controller at the work space and connected to a standard computer communication network to receive data packets including operational commands for the variable flow control device; and a personal computer at the work space and connected to the standard computer communication network, the personal computer being programmed to execute a user interface program that enables a worker to set a desired value for an environmental parameter setting, the user interface program configured to embed the desired value of the environmental parameter setting in a data packet;

wherein the controller responds to the data packet by producing the control signal which alters the flow control device.

\* \* \* \* \*